(12) United States Patent
Michael et al.

(10) Patent No.: US 9,292,354 B2
(45) Date of Patent: Mar. 22, 2016

(54) SELF-ADJUSTING FRAMEWORK FOR MANAGING DEVICE CAPACITY

(71) Applicant: Microsoft Corporation, Redmond, WA (US)

(72) Inventors: Michael Leonida Michael, Houston, TX (US); Ashvinkumar Jayantilal Sanghvi, Sammamish, WA (US); Bahadir Baris Onalan, Bellevue, WA (US); Gaurav Kapila, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 14/057,753

(22) Filed: Oct. 18, 2013

(65) Prior Publication Data

US 2015/0112915 A1    Apr. 23, 2015

(51) Int. Cl.
*G06F 9/50* (2006.01)
*G06N 5/04* (2006.01)

(52) U.S. Cl.
CPC ............ *G06F 9/5077* (2013.01); *G06F 9/5072* (2013.01); *G06N 5/04* (2013.01)

(58) Field of Classification Search
CPC ................................. G06F 9/5077; G06N 5/04
See application file for complete search history.

(56) References Cited

U.S. PATENT DOCUMENTS

| 6,856,983 | B2 | 2/2005 | Cox et al. |
| 8,478,845 | B2 | 7/2013 | Agarwala et al. |
| 2011/0145392 | A1 | 6/2011 | Dawson et al. |
| 2012/0254443 | A1* | 10/2012 | Ueda ............................ 709/226 |
| 2013/0086273 | A1 | 4/2013 | Wray et al. |
| 2015/0074679 | A1* | 3/2015 | Fenoglio et al. ............. 718/104 |

OTHER PUBLICATIONS

Feller, et al., "Snooze: A Scalable and Autonomic Virtual Machine Management Framework for Private Clouds", In 12th IEEE/ACM International Symposium on Cluster, Cloud and Grid Computing, May 13, 2012, 8 pages.
"Internal Cloud Capacity Control", Retrieved on: Jul. 29, 2013, Available at: http://www.cirba.com/Solutions/Capacity-Control-in-Internal-Clouds.htm.
Shanmuganathan, et al., "Defragmenting the Cloud Using Demand-based Resource Allocation", In ACM SIGMETRICS Performance Evaluation Review, vol. 41, Issue 1, Jun. 2013, 12 pages.
Sanzo, et al., "Auto-tuning of Cloud-based In-memory Transactional Data Grids via Machine Learning", In Second Symposium on Network Cloud Computing and Applications, Dec. 3, 2012, 8 pages.
"Amazon Elastic Compute Cloud (Amazon EC2)", Published on: May 26, 2009, Available at: http://aws.amazon.com/ec2/.
Mao, et al., "Cloud Auto-Scaling with Deadline and Budget Constraints", 11th IEEE/ACM International Conference on Grid Computing, Oct. 25, 2010, 9 Pages.
"International Search Report and Written Opinion Issued for PCT Application No. PCT/US2014/060212", Mailed Date: Jan. 29, 2015, 8 Pages.

* cited by examiner

*Primary Examiner* — Alan Chen
(74) *Attorney, Agent, or Firm* — Henry Gabryjelski; Doug Barker; Micky Minhas

(57) ABSTRACT

Automatically improving a deployment. A method includes, in a live distributed computing environment, adjusting operating parameters of deployment components. Effects of the adjusted operating parameters are observed. At least a portion of a behavior model function is defined based on the adjusted operating parameters and observed effects. Based on current distributed computing environmental conditions, operating parameters defined in the behavior model function are adjusted to improve the deployment.

20 Claims, 4 Drawing Sheets

SELF-ADJUSTING FRAMEWORK FOR MANAGING DEVICE CAPACITY

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently obtain data from other computing systems.

Interconnection of computing systems has facilitated distributed computing systems, such as so-called "cloud" computing systems. In this description, "cloud computing" may be systems or components for enabling ubiquitous, convenient, on-demand network access to a shared pool of configurable computing components (e.g., networks, servers, storage, applications, services, etc.) that can be provisioned and released with reduced management effort or service provider interaction. A cloud model can be composed of various characteristics (e.g., on-demand self-service, broad network access, component pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Cloud computing fundamentally changes the nature of capacity planning, performance optimization, scheduling and cost optimization, because of its on-demand nature. With cloud computing, there is no need to model performance and capacity in a lab for months before deployment and there is no need to anticipate load years in advance to purchase the right gear. On the other hand, there are now a new set of challenges and opportunities. For example, the cost and performance are a function of virtual machine (VM) geometry, geographical location, scale out ability, quality of service (QOS) requirements, placement and relative placement of components with respect to each other, internally tunable knobs for various components, etc. Similarly, the cost of running an app changes based on the components one purchases (source of components, spot prices for components, type of components, quantity of components, etc.). Also, in modern applications, application code can morph rapidly. Further, internet facing load characteristics could be characterized by spikes of high load demand and additionally or alternatively being fast evolving.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a cloud computing environment for a distributed service or application. The method includes acts for automatically improving a deployment. The method includes in a live cloud computing environment, adjusting operating parameters of deployment components. Effects of the adjusted operating parameters are observed. At least a portion of a behavior model function is defined based on the adjusted operating parameters and observed effects. Based on current cloud computing environmental conditions, operating parameters defined in the behavior model function are adjusted to improve the deployment.

In another example practiced in a cloud computing environment for a distributed service or application, a method of automatically improving a deployment based on anticipated loads to the deployment is implemented. The method includes in a live cloud computing environment, identifying how a load is expected to change over time. The method further includes determining how long applied adjustments to operational parameters of deployment components in the live cloud computing environment take to become effective. Operational parameters of deployment components are adjusted in anticipation of the load changing over time. Adjusting operational parameters in anticipation of the load changing over time is performed in view of how long applied adjustments to operational parameters take to become effective.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein may use programmatic ways of parallel experimentation to build models for components in a service as well as a model for the overall service. This modeling may be done on a live system, while serving loads and meeting SLAs. Over time, based on the programmatic modeling, embodiments can trim expensive components and make component tradeoffs to get an improved configuration to meet different load points.

In parallel, an embodiment can also build a model of service loads over time, so that the embodiment can adjust the optimal configuration in just enough time to minimize costs while meeting SLAs (and operational level agreements (OLAs)). After code changes, embodiments can measure for any behavior changes and once again experiment to readjust the model. For example, some embodiments may use Taguchi methods to adjust a model.

Embodiments may allow a cloud deployment customer to define an initial capacity plan for the customer's cloud components as well as a set of inputs, cost look up tables and preferred behavior characteristics. The framework will learn, over time, through the use of components and experimentation to achieve minimal cost configuration while meeting SLAs. Embodiments may also learn expected load patterns and make the improvement adjustments sufficiently ahead of time so as not to suffer brief periods of SLA violations as the system adapts to changing loads during a business cycle. In particular, many changes take time to propagate to the point where they improve performance. Thus, such changes can be made in anticipation of changing loads such that changes take effect when or before loads change. Similarly, if over time, there is a gradual change in load patterns or in code/environment behavior, the system can continue to adapt. Additionally, a learned behavior can be saved and cloned to start other instances of the service.

In the cloud and with agile development, old style capacity planning and performance tuning and modeling may not be sufficient. Loads and code change continuously. In contrast, embodiments described herein may be able to take advantage of the virtually infinite capacity and programmability of the cloud environment to automatically optimize cost while meeting SLAs.

Figure 1:
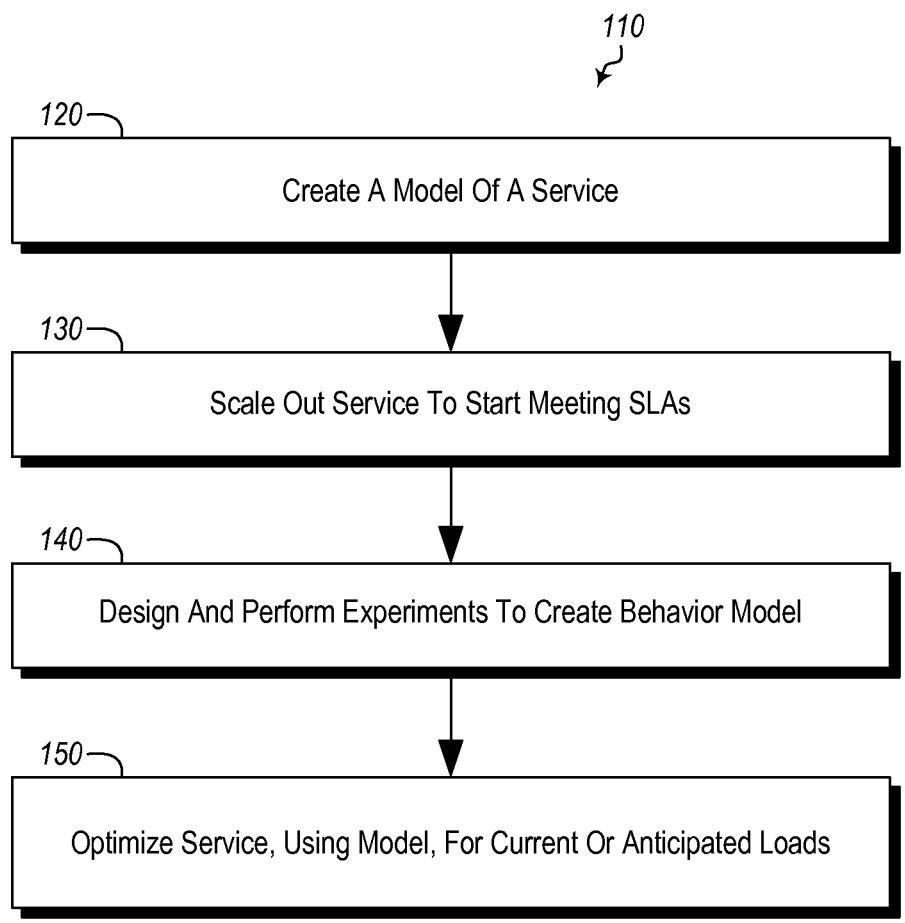
FIG. 1 illustrates an example flow for service initialization, model construction and service optimization.
Figure 2:
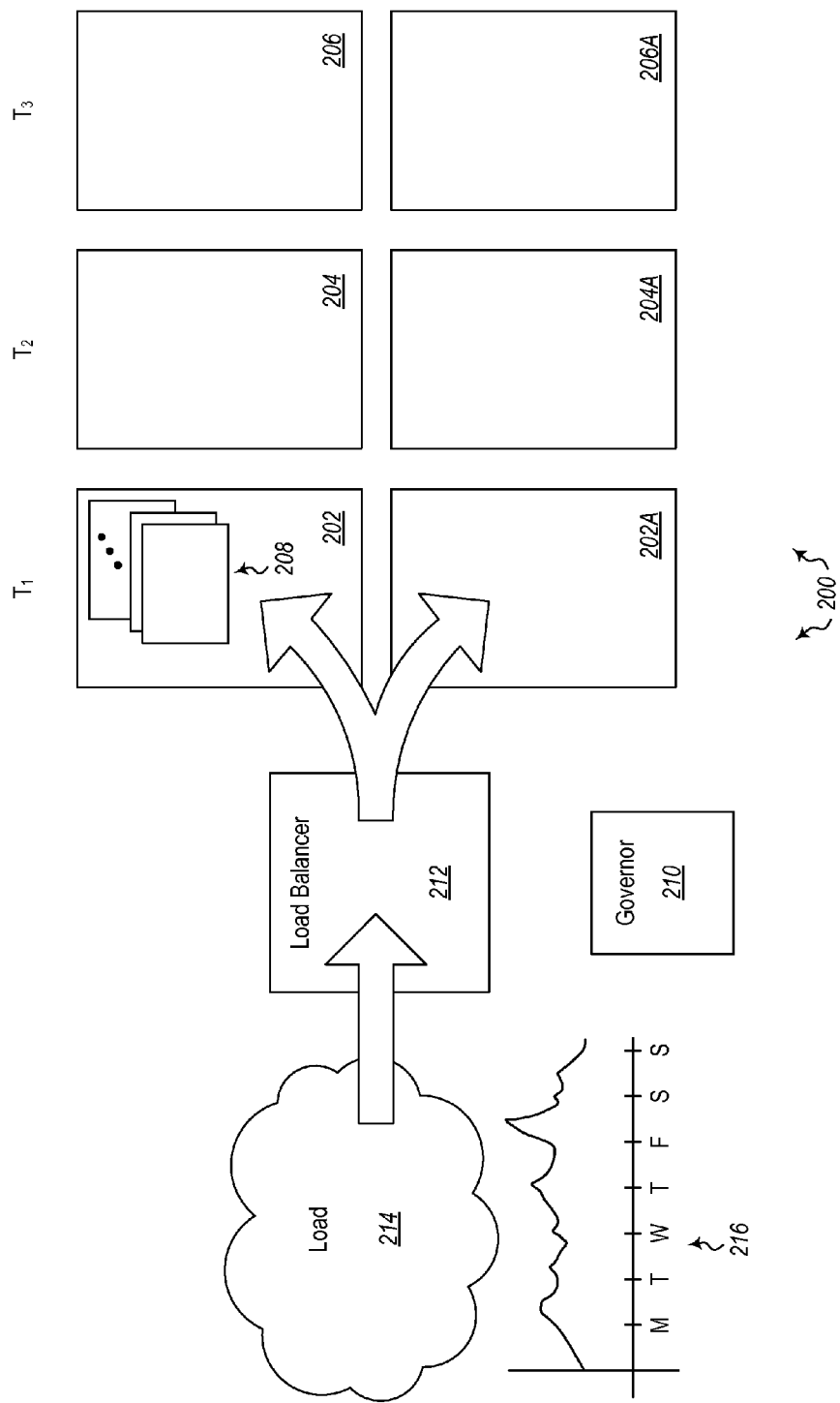
FIG. 2 illustrates an example system where operational adjustments can be applied.

Referring now to FIG. 1, a general flow 110 of how a system might be initialized, modeled and adjusted is illustrated. As illustrated at 120, a model of a service is created. In particular, a model of a service is created with certain constraints and requirements. In particular, the model may be defined to have certain constraints and/or axis of freedom. In particular, the model can define the overall structure of a server, where components can be placed in the service, QOS requirement, SLAs applied to the service, minimum scale of components, maximum scale of components, choice of cloud service providers, etc. An example of a system model is illustrated in FIG. 2.

As illustrated at 130, once the service model is created, embodiments can scale out the service to start meeting SLAs and/or other requirements. Such a scale out can be done in several different ways. For example, in a brute force example, embodiments may simply allocate some maximum amount of resources to the service. Alternatively, the system could allocate incremental amounts of resources until SLAs are met. In some embodiments, the incremental amounts may be allocated on an exponential basis with respect to a maximum limit, such that large amounts of resources are allocated in a first increment, with exponentially lower amounts, up to the maximum limit, being allocated in subsequent increments. Alternatively, embodiments may simply incrementally allocate some step value of resources to the service until SLAs are met. While not discussed specifically herein, other scale out actions may be alternatively or additionally taken.

As illustrated at 140, embodiments can design and perform experiments (such as experiments with respect to changing geometries, changing tiers, changing scale out, changing scale up, configuration changes, changing QoS, etc.), to create one or more behavior models. The goal of these actions is to study a running service that is under production by modifying the service, but without violating SLAs. Embodiments can increment, decrement or otherwise change various variable setting parameters, within constraints defined for the service, and observe and measure resulting ambient inputs and outcomes. For example, embodiments can determine the effects of parameter setting on costs, efficiencies, response times, time for changes to take effect, etc. for various (or all) of the components in the service. Using this information, embodiments can build models for each component and/or the service as a whole. In some embodiments, behavior models may be built using regression, or other appropriate techniques, for each component in the service. Embodiments can build an aggregate behavior model for the service. The aggregate model for the system may be made from tier behavior models (as described below) based on scaling and placement. In some embodiments, parallel experimentation may be performed to model adjustments to different components and tiers together.

As illustrated at 150, the service can be optimized, using the behavior models, for current or anticipated loads. With respect to current loads, embodiments can reduce all usage which has no impact or positive impact to the outcomes, to any constraint limits defined in the service model. Reducing usage can be performed where the most expensive usage is reduced first. For example, based on rate cards, the usage model, and the service model, an embodiment can determine that extra processors are more expensive than extra memory. Thus, processors can be reduced before memory is reduced. Usage reduction can be done until SLA limits are reached, or until SLA limits plus some headroom clearance level (to account for unexpected loads) is reached.

The scaling could be done to decrease usage when feasible or increase usage due to varying loads, varying inputs, etc. Notably, in some embodiments, some component usage can be increased while other component usage is decreased to reduce overall cost.

As noted, anticipatory adjustments may be made using the service model and the behavior model(s). For example, embodiments may build a load and ambient variables behavior baseline model. Then based on anticipation of a changing load (e.g. based on day, time, month, quarter, etc.) usage parameters can be adjusted over time as needed. In this way, changes can be applied in anticipation of changing loads and/or conditions in advance instead of reacting to changes and needing a larger safety margin.

Referring now to FIG. 2, a service illustrated as an example cloud system 200 is illustrated. The cloud system 200, in this particular example, includes three tiers 202, 204, and 206. While three tiers are illustrated in the present example, it should be appreciated that a different number of tiers may be implemented in other embodiments. The three tiers may represent for example, a system that includes a customer facing web tier, a processing mid-tier, and a storage tier. The first tier 202 is shown as including a set 208 of virtual machines. As used herein, components in a system may be a tier, a virtual machine, a virtual processor, memory, storage, network resources, etc.

FIG. 2 illustrates that the system 200 includes a governor 210. The governor 210 can make adjustments to various operating parameters, including changes to what components are implemented in the system. For example, the governor 208 can change the topology (e.g. location of components within a tier, within the system or relative to other components) of virtual machines in a given tier. Alternatively or additionally, the governor can adjust the quality of service (QoS) provided by a given tier. Alternatively or additionally, the governor 210 may adjust the number of virtual processors allocated to a given virtual machine. Alternatively or additionally, the governor 210 may adjust the amount of memory allocated to a given that virtual machine. Alternatively or additionally, the governor 210 may adjust the amount of storage allocated to a given virtual machine. Alternatively or additionally, the governor 210 may adjust the scale (e.g. number of components to implement a tier or a system). Alternatively or additionally, the governor 210 may adjust the amount of bandwidth allocated to a virtual machine or tier. Alternatively or additionally, the governor 210 may adjust internal settings (e.g. number of threads, geographic location of tiers, etc.). Etc.

The governor 210 may monitor inputs and outputs to determine the effect of parameter adjustments on the overall system 200. Example inputs may include transaction arrival rate, CPU utilization, memory utilization, I/O rate, etc. Example outputs that may be monitored by the governor 210 include for example, throughput, response time, cost per hour, delays, error rate, key performance indicators (KPIs), etc.

The governor 210 may persist certain information. For example, the governor may maintain behavior models of system components. The governor may maintain an overall system behavior model made up of system component models. The governor may maintain weights based on impact of parameter adjustments. The governor can also maintain combinations or multiple weights and their impact on parameter adjustment. The governor may maintain information regarding experimentation parameters. In particular, the governor may maintain information about what effect certain adjustments will have. The governor may maintain information regarding a load baseline. In particular the governor may have information as to what loads might generally be expected irrespective of time. This could be, for example, an average load or median load. The governor may maintain information regarding a time baseline. For example, the governor may maintain information about how loads can be expected to change over time. An average or median load quantity can be stored based on a time, a day, a week, a month, etc. The governor may maintain information regarding service level agreements (SLAs). The governor may maintain information regarding the amount of time it takes to affect change in system components such that the system can handle increased loads.

FIG. 2 further illustrates for the first tier 202 that a parallel test tier 202A may be implemented. The parallel test tier 202A may include components similar to the first tier 202. The system 200 maybe a live operating system handling real world service requests from clients and customers. In the example illustrated where a parallel test tier 202A is implemented, a load balancer 212 may be used to distribute real world requests between the original tier 202 and the parallel test tier 202A. While this is occurring, the governor 20210 can make various adjustments to the parallel test tier 202A and observe any improved or degraded operation in comparison to the tier 202 as a result of the adjustments made. Adjustments that improve performance can be copied and applied to the original tier 202.

While in the example illustrated in FIG. 2, the parallel test tier 202A is shown, it should be appreciated that in other embodiments different components may be implemented in parallel for testing purposes. For example, some embodiments may implement parallel test virtual machines within the set 208 of virtual machines. In this case, adjustments can be made to parameters for a virtual machine to determine the effects of the adjustments in contrast to other virtual machines for which adjustments are not made, whether helpful or deleterious.

Alternatively or additionally, embodiments can perform adjustments to different components at the same time. For example, FIG. 2 illustrates parallel tiers 202A, 204A and 206A. Adjustments can be made to all three of these tiers simultaneously to determine aggregate effects of several different parameter adjustments occurring together.

While FIG. 2 illustrates adjustments being made to parallel test components, it should be appreciated that other embodiments can make the adjustments to already existing components without implementing parallel test components. Historical data or other information may be used to determine effects of adjusting operational parameters.

The governor 210 can also build an internal regression model of the expected loads as relative to the various business cycle parameters. For example, models may be able to predict expected loads based one or more of day of the week, time of the day, month, days to end of month, quarter, days to end of quarter, year, days to end of year, etc. The model may also be able to predict the amount of time to affect a change in the system. This may also be based on measured and learned parameters. Using this information, embodiments can adjust parameters in advance to meet expected load changes.

FIG. 2 further illustrates a load 214. As illustrated in FIG. 2 in the graph 216, the load 214 can be expected to change over time. For example, the graph 216 shows an expected load volume on a weekly basis, based on historical monitoring of loads. Embodiments may include functionality to adjust parameters in anticipation of changing loads. In some embodiments, the governor 210 may have information indicating an amount of time that is needed for a change to become effective to be able to handle an anticipated load. For example, if it is known that the load will have a high volume Friday at 8:30 AM, and that it takes ½ hour to bring certain components online to handle the load, then adjustments may be made at 8:00 AM on a particular Friday morning in anticipation of the high volume load at 8:30 AM.

Embodiments include functionality for structural model discovery: The system automatically infers the structure of the service (e.g. tiers, VM geometry, QOS, scaling options, etc.) from a service template or service model, as defined at 120 of FIG. 1, that is used to initialize the service. For example, as described below, a system may be initialized based on a definition of certain components and settings. This definition can be used to infer the structure of the service. Further, a user may point to counters to (from instrumentation or outside in tests) metrics that are of interest in defining SLAs and costs. This can be used to set various targets to be achieved by parameter adjustments.

A user can optionally define other application configuration parameters (e.g. caching parameters, threads, etc.) which can be adjusted. In some embodiments, a configuration wizard provides the customer with the discovered indicators and allows the customer to classify the indicators into categories.

Such categories may include, for example, load, external stimuli, available resources, downstream, error conditions, internal metrics, KPIs, etc.

Embodiments may be configured to support rate sheets and performance goals. A user sets performance goals. The user may set, for example, lower performance bounds, upper performance bounds and/or warning levels over the counters described above (e.g. SLAs, throughput, etc.). The user may also point to rate sheets or rate tables that define the cost of various resources selected for use. Alternatively, such as for example in an automatic chargeback system, the user can just point to cost metrics on a per tier and/or network basis.

As illustrated at 130 in FIG. 1, the system is initialized at some level. For example, a customer may define the initial capacity plan to bootstrap the system in allocating resources for their service. A customer can optionally define capacity plan parameters which may include both a time-based and a performance-based component.

As illustrated in FIG. 2, embodiments may include a service governor 210. The service governor 210 may include an application programming interface (API) to deploy and configure the services as well as to read the counters. The service governor starts monitoring multiple inputs for the learning algorithms. For example, as discussed previously, the service governor may monitor: performance counters; application data; exceptions, errors, event logs; etc.

Once the system is initialized and started, the governor starts self-learning the model of each tier, including learning factors such as capacity, performance, cost etc. In parallel, while the service is live and serving clients, as illustrated at 140 in FIG. 1, the governor will start more scaleout tiers and start experimenting with the geometries, scaleout and other factors. The governor starts measuring the impact of changes to the service through experimentation and necessity. Necessity refers to the need to add components to meet SLAs. Thus, components are added and their impact is measured.

Experimentation by the governor can determine cost for adjusting different knobs and what benefit the adjustments provide. The governor can also determine if the knob's benefit aligns with a customer defined strategy. Some changes only have positive effects (e.g. better performance and lesser costs) and should be done. Others may need to be tuned based on whether at this point the component is above or below SLAs. Over engineered components (e.g. those that exceed SLAs) can be dialed down. In some embodiments, if different knob turns have the same effect, the most cost saving knob turns will be selected over other knob turns. The following table summarizes decisions that can be made, in some embodiments, with respect to parameter adjustments:

| Change Impact | Cost Increases | Cost Decreases |
|---|---|---|
| Performance Increases | Classify as desirable change if SLAs are met | Classify always as a desirable change |
| Performance Decreases | Classify always as a non-desirable change | Classify as desirable change if SLAs are met |

While the above table illustrates some general guidelines when making and evaluating changes, it should be appreciated that other criteria may be used that violate the general principles illustrated in the table.

The system can assign a weight to a change based on its impact. Certain changes that were not beneficial or went against the SLAs will not be repeated while favorable changes can be made as needed or when possible to make such changes.

As noted above, the framework can alter a variety of system parameters during experimentation to measure their impact. For example, embodiments may alter configuration parameters. Such configuration parameters may include configuration of threads, pools, processors, disk types, network, storage classification, etc. Alternatively or additionally, embodiments may alter scale parameters. Alternatively or additionally, embodiments may alter instance type changes. Alternatively or additionally, embodiments may alter specific tier changes. Alternatively or additionally, embodiments may alter different versions of the same component.

In a more aggressive configuration, the governor 210 can also experiment with QoS as well as relative positions of tiers. Both of these are done via parameter changes in the placement of the components. These are coarse changes and will once again be followed by the above described auto tuning.

The governor 210 can also use its data and models to allow customer experimentation using what-if analysis. Given a set of inputs, embodiments can simulate expected results and better understand component consumption, usage spikes, and use the framework to help mitigate concerns and identify solutions.

In yet another example of functionality that might be implemented, certain applications might perform multiple functionalities. A service may have multiple components that do different work. For example a service might be doing cataloging and also servicing live requests. Under load, one option is to configure the service in such a way that high priority activities are given higher QoS (e.g. servicing live requests) while lower priority activities (e.g. cataloging) are given lower QoS or delayed. Embodiments can experiment with pausing execution of lower priority activities and measure the impact of pausing on the overall performance of the service. This can be useful when an unexpected high load is experienced (e.g., one that does not conform to graph 216) at the service and the service needs to react quickly. Lower priority activities can resume once the resources are stable.

In another example, an order processing system might have a job for processing and scheduling the actual order and a component that is emailing customers to let them know of the shipping date. Both components of the system have an SLA for completing the work, but that work can come in at different times based on priority and current load. As illustrated above, using the graph 216 information can be maintained about what are the key knobs that need to be turned depending on load. Similarly, embodiments can expand that graph to have a better understanding of the impact of each component at each different load variations. Based on that impact and resources needed, embodiments can control the individual component allocation of resources to meet the current demand and SLAs. Thus, some embodiments may include throttling of low priority jobs as a knob. Such embodiments may further include turn-around times for different types of transactions and jobs to the outcomes and SLAs that are watched.

Figure 3:
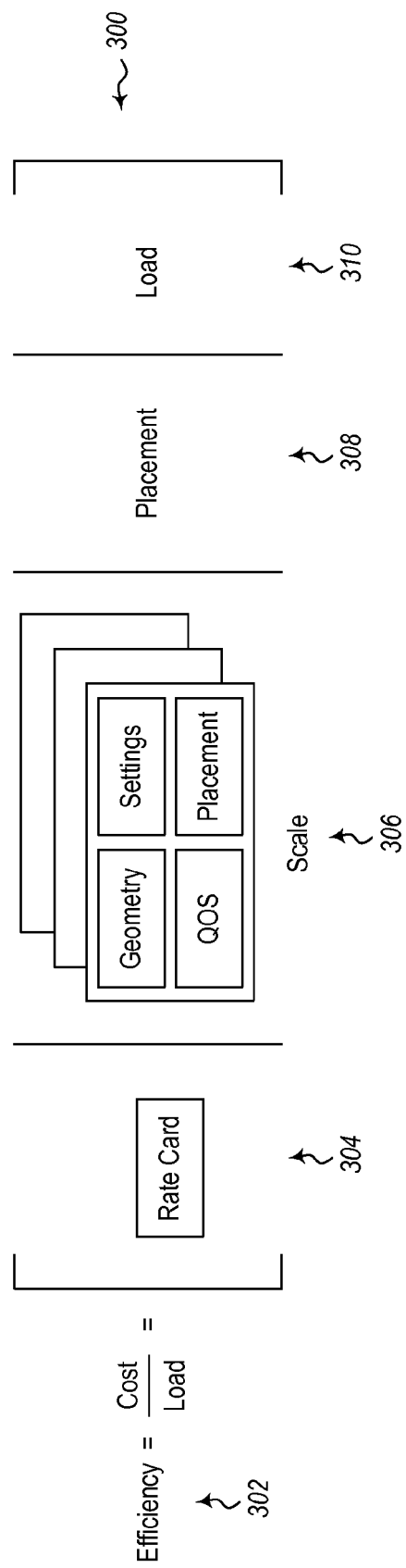
FIG. 3 illustrates an example behavior model function of a system.

Referring now to FIG. 3, a behavior model function 300 is illustrated. The behavior model function may be created based on experimentation of the system 200. In this particular example, the behavior model function defines efficiency 302, which is defined as cost per load. Several factors can be taken into account to make this determination.

For example, the behavior model function 300 may include a rate card factor 304. The rate card factor 304 includes information about the cost of components in the system 200.

For example, the rate card factor 304 may define the cost of a virtual machine, the cost of a virtual processor, the cost of memory, the cost of storage, etc. Notably, information in the rate card factor 304 may change over time. In particular, rates of system components often change over time in an auction format. The rate card factor 304 may further include rate card information for different providers or geographical regions. Thus, one adjustment may be an adjustment moving a system to a new cloud provider. This can be accounted for in the behavior model function 300.

The behavior model function further includes a scale factor 306. In the illustrated example, the scale factor 306 includes parameters related to geometry, internal settings, QoS, component placement, etc. As illustrated by the inclusion of several different representations, these parameters may be adjusted differently for different components, such as different tiers, virtual machines, etc.

The behavior model function 300 further includes a placement factor 308. The placement factor 308 may define where various components are placed in the system 200.

The behavior model function 300 further includes a load factor 310. The load factor includes information about how loads change over time. For example, the load factor may include information such as that contained in the graph 216.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
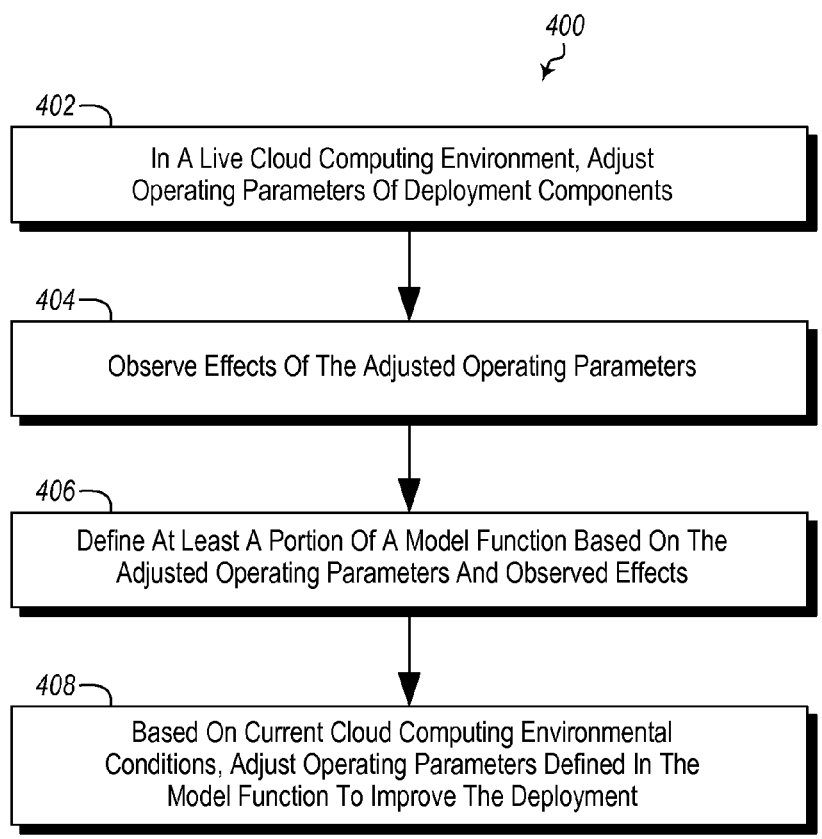
FIG. 4 illustrates a method of automatically improving a deployment.

Referring now to FIG. 4, a method 400 is illustrated. The method 400 may be practiced in a cloud computing environment for a distributed service or application. The cloud computing environment could be, for example, either a public cloud computing environment or a private cloud computing environment. The method includes acts for automatically improving a deployment. The method 400 includes in a live cloud computing environment, adjusting operating parameters of deployment components (act 402). For example, embodiments may make changes to what components are implemented in the system; the topology of the system, the quality of service (QoS) provided, the number of virtual processors allocated to a given virtual machine, the amount of memory allocated to a given that virtual machine, the amount of storage allocated to a given virtual machine, the scale of a system, the amount of bandwidth allocated to a virtual machine or tier, internal settings, etc.

The method further includes observing effects of the adjusted operating parameters (act 404). For example, embodiments may monitor inputs and outputs to determine the effect of parameter adjustments on the overall system. Example inputs may include transaction arrival rate, CPU utilization, memory utilization, I/O rate, etc. Example outputs that may be monitored include for example, throughput, response time, cost per hour, delays, error rate, KPIs, etc.

The method further includes defining at least a portion of a behavior model function based on the adjusted operating parameters and observed effects (act 406). For example, a behavior model function such as that illustrated in FIG. 3 may be created. This creates a model of the system that can be evaluated to determine how improvements can be made.

The method further includes based on current cloud computing environmental conditions, adjusting operating parameters defined in the behavior model function to improve the deployment (act 408).

The method 400 may further include: identifying how a load is expected to change over time; and adjusting operational parameters defined in the behavior model function in anticipation of the load changing over time. The example illustrated in FIG. 2 illustrates that anticipated load is known based on information in the graph 216. Adjustments can be made to the system in anticipation of the load changing. In some such embodiments, the method may further include determining how long applied adjustments to operational parameters take to become effective. In some such embodiments, adjusting operational parameters defined in the behavior model function in anticipation of the load changing over time is performed in view of how long applied adjustments to operational parameters take to become effective. Thus, if it takes ½ hour for a change to become effective, an adjustment may be made ½ hour before the adjustment is needed.

Some embodiments may perform automatic adjustment. This may be based on anticipated load, performance changes, identification of under used components, etc.

The method 400 may be practiced where the behavior model function comprises one or more parameters related to rates charged for components. For example, the behavior model function may include a rate card factor, such as the rate card factor 304.

The method 400 may be practiced where the behavior model function comprises one or more parameters related to topology of the live cloud computing environment. For example, FIG. 3 illustrates an example where a placement factor 308 is included in a behavior model function 300.

The method 400 may be practiced where the behavior model function comprises one or more parameters related to configuration settings of components in the live cloud computing environment. The method 400 may be practiced where the behavior model function comprises one or more parameters related to geometry of components in the live cloud computing environment. The method 400 may be practiced where the behavior model function comprises one or more parameters related to quality of service (QoS) required for the live cloud computing environment. As illustrated in FIG. 3, these might be part of the scale factor 306.

The method 400 may be practiced where adjusting operating parameters defined in the behavior model function is performed until a particular pre-defined threshold is reached. The threshold may be outside of the function as an external threshold or included as part of the function as an internal limit. Such thresholds may include one or more of SLAs, error rates, timeouts, cost, response time, throughput KPI, etc.

The method 400 may be practiced where adjusting operating parameters defined in the behavior model function comprises adjusting a plurality of different parameters in parallel. For example adjustments could be made to different tiers or virtual machines at the same time.

The method 400 may further include using the adjusted operating parameters to start a new instance of a service. For example, a new service could be implemented and the bootstrapped state of the system would be determined from a previously improved system.

The method 400 may be practiced where adjusting operation parameters is performed on an experimental parallel component implemented in parallel with a working component. Parameter adjustments are not made on the working components while the adjustments are being made on the experimental component. Once a predetermined confidence is achieved in the experimental component adjustments, the adjusted parameters of the experimental component are applied to the working component. For example, as illustrated in FIG. 2, adjustments could be made to the parallel test components 202A, 204A or 206A to determine the effects of the adjustments. Once it is determined which adjustments are useful and/or improve performance, those adjustments can be applied to the components 202, 204 or 206.

The method 400 may be practiced where adjustments are made and the model adjusted in various different ways. For example, adjustments may be made to continually update the behavior model function. Alternatively or additionally, adjustment may be made periodically to update the behavior model function. Alternatively or additionally, adjustment may be made until some predetermined threshold is met.

Figure 5:
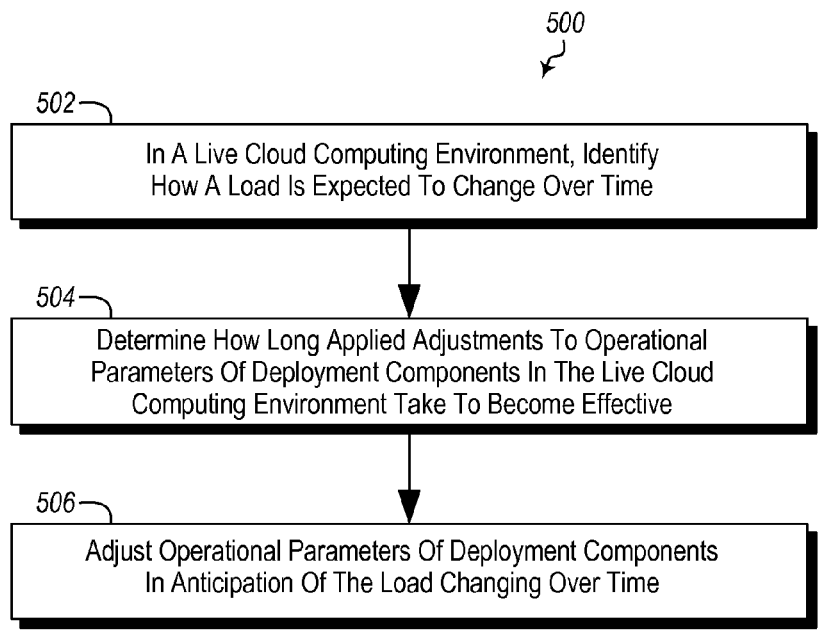
FIG. 5 illustrates a method of automatically improving a deployment based on anticipated loads to the deployment.

Referring now to FIG. 5, a method 500 is illustrated. The method 500 may be practiced in a cloud computing environment for a distributed service or application. The method includes acts for automatically improving a deployment based on anticipated loads to the deployment. The method 500 includes in a live cloud computing environment, identifying how a load is expected to change over time (act 502) For example, as illustrated in FIG. 2, the graph 216 includes information that can be identified as to how the load 214 changes over time.

The method 500 further includes determining how long applied adjustments to operational parameters of deployment components in the live cloud computing environment take to become effective. As illustrated in the example above, it may hypothetically take ½ hour for a change to be effective. This could be determined based on stored information indication such time based on historical changes, or by other methods.

The method 500 further includes adjusting operational parameters of deployment components in anticipation of the load changing over time. Adjusting operational parameters defined in the behavior model function in anticipation of the load changing over time is performed in view of how long applied adjustments to operational parameters take to become effective.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

In its most basic configuration, a computing system typically includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. The computing system may also contain communication channels that allow the computing system to communicate with other message processors over, for example, the network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing components (e.g., networks, servers, storage, applications, and services). The definition of "cloud computing" is not limited to any of the other numerous advantages that can be obtained from such a model when properly deployed.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment for a distributed service or application, a method of automatically improving a deployment, the method comprising:
   in a live distributed computing environment, adjusting operating parameters of deployment components;
   observing effects of the adjusted operating parameters;
   defining at least a portion of a behavior model function based on the adjusted operating parameters and observed effects; and
   based on current distributed computing environmental conditions, adjusting operational parameters defined in the behavior model function to improve the deployment wherein adjusting the operational parameters is performed on an experimental parallel component implemented in parallel with a working component, while not adjusting parameters on the working component, the method further comprising:
   determining that a predetermined confidence level has been achieved in the experimental component; and
   as a result of determining that a predetermined confidence level has been achieved in the experimental component, applying the adjusted parameters of the experimental component to the working component.

2. The method of claim 1, further comprising:
identifying how a load is expected to change over time; and
adjusting operational parameters defined in the behavior model function in anticipation of the load changing over time.

3. The method of claim 2, further comprising:
determining how long applied adjustments to operational parameters take to become effective; and
wherein adjusting operational parameters defined in the behavior model function in anticipation of the load changing over time is performed in view of how long applied adjustments to operational parameters take to become effective.

4. The method of claim 1, wherein the behavior model function comprises one or more parameters related to rates charged for components.

5. The method of claim 1, wherein the behavior model function comprises one or more parameters related to geometry of components in the live distributed computing environment.

6. The method of claim 1, wherein the behavior model function comprises one or more parameters related to configuration settings of components in the live distributed computing environment.

7. The method of claim 1, wherein the behavior model function comprises one or more parameters related to topology of the live distributed computing environment.

8. The method of claim 1, wherein the behavior model function comprises one or more parameters related to quality of service (QoS) required for the live distributed computing environment.

9. The method of claim 1, wherein adjusting operating parameters defined in the behavior model function is performed until a particular pre-defined threshold is reached.

10. The method of claim 1, wherein adjusting operating parameters defined in the behavior model function comprises adjusting a plurality of different parameters in parallel.

11. The method of claim 1, further comprising using the adjusted operating parameters to start a new instance of a service.

12. The method of claim 1, wherein the behavior model function is a function of an entire distributed service.

13. The method of claim 1, wherein adjusting operating parameters defined in the behavior model function is performed by suspending activities based on the activities being lower priority than other activities.

14. In a distributed computing environment for a distributed service or application, a method of automatically improving a deployment based on anticipated loads to the deployment, the method comprising:
   in a live distributed computing environment, identifying how a load is expected to change over time;
   determining how long applied adjustments to operational parameters of deployment components in the live distributed computing environment take to become effective; and
   adjusting operational parameters of deployment components in anticipation of the load changing over time, wherein adjusting operational parameters is performed on an experimental parallel component implemented in parallel with a working component, while not adjusting parameters on the working component, the method further comprising:
      determining that a predetermined confidence level has been achieved in the experimental component; and
      as a result of determining that a predetermined confidence level has been achieved in the experimental component, applying the adjusted parameters of the experimental component to the working component.

15. The method of claim 14, wherein adjusting operational parameters of deployment components is performed by adjusting operating parameters defined in a behavior model function.

16. In a distributed computing environment for a distributed service or application, a system for automatically improving a deployment, the system comprising:
   one or more processors; and
   one or more computer readable media, wherein the one or more computer readable media comprise computer executable instructions that when executed by at least one of the one or more processors cause the system to perform the following:
      in a live distributed computing environment, adjusting operating parameters of deployment components;
      observing effects of the adjusted operating parameters;
      defining at least a portion of a behavior model function based on the adjusted operating parameters and observed effects; and
      based on current distributed computing environmental conditions, adjusting operational parameters defined in the behavior model function to improve the deployment, wherein adjusting the operational parameters is performed on an experimental parallel component implemented in parallel with a working component, while not adjusting parameters on the working component, the method further comprising:
         determining that a predetermined confidence level has been achieved in the experimental component; and
         as a result of determining that a predetermined confidence level has been achieved in the experimental component, applying the adjusted parameters of the experimental component to the working component.

17. The system of claim 16, further comprising computer executable instructions that when executed by at least one of the one or more processors cause the system to perform the following:
   identifying how a load is expected to change over time; and
   adjusting operational parameters defined in the behavior model function in anticipation of the load changing over time.

18. The system of claim 17, further comprising computer executable instructions that when executed by at least one of the one or more processors cause the system to perform the following:
   determining how long applied adjustments to operational parameters take to become effective; and
   wherein adjusting operational parameters defined in the behavior model function in anticipation of the load changing over time is performed in view of how long applied adjustments to operational parameters take to become effective.

19. The system of claim 17, wherein the observed effects include at least one of a response time or an error rate.

20. The system of claim 16, wherein adjusting operating parameters defined in the behavior model function is performed until a particular pre-defined threshold is reached.

* * * * *